(12) United States Patent
Yu et al.

(10) Patent No.: US 11,701,805 B2
(45) Date of Patent: Jul. 18, 2023

(54) MANUFACTURING METHOD OF A TRANSFER-MOLDED INDUCTOR

(71) Applicant: Shenzhen Sunlord Electronics Co., Ltd., Guangdong (CN)

(72) Inventors: Xinshu Yu, Guangdong (CN); Shengcheng Xia, Guangdong (CN)

(73) Assignee: Shenzhen Sundlord Electronics Co., Ltd., Guangdong (CN)

( * ) Notice: Subject to any disclaimer, the term of this patent is extended or adjusted under 35 U.S.C. 154(b) by 999 days.

(21) Appl. No.: 16/443,808

(22) Filed: Jun. 17, 2019

(65) Prior Publication Data

US 2020/0086536 A1   Mar. 19, 2020

Related U.S. Application Data

(63) Continuation of application No. PCT/CN2018/105406, filed on Sep. 13, 2018.

(51) Int. Cl.
*B29C 45/02* (2006.01)
*B29C 45/00* (2006.01)
*H01F 27/30* (2006.01)

(52) U.S. Cl.
CPC .......... *B29C 45/02* (2013.01); *B29C 45/0013* (2013.01); *H01F 27/30* (2013.01); *B29K 2995/0008* (2013.01)

(58) Field of Classification Search
CPC .................... B29C 45/02; B29C 45/0013
See application file for complete search history.

(56) References Cited

U.S. PATENT DOCUMENTS 5,429,701 A * 7/1995 Lu .................... H05K 3/323
156/272.4
7,415,757 B2 * 8/2008 Satoh .................... A61B 8/145
336/200

(Continued)

FOREIGN PATENT DOCUMENTS

CN          101615480 A      12/2009
CN          102737802 A      10/2012

(Continued)

OTHER PUBLICATIONS

English machine translation of JP2015088545 performed by Google Patents (Year: 2022).*

*Primary Examiner* — Edmund H Lee
(74) *Attorney, Agent, or Firm* — Winston Hsu

(57) ABSTRACT

Disclosed are a transfer-molded inductor and a manufacturing method thereof. The inductor comprises a magnet formed by transfer molding with a soft magnetic colloid; and a prefabricated coil assembly comprising an air-core coil and electrode sheets connected at two ends of the air-core coil. The method comprises steps of: connecting a prefabricated air-core coil and an electrode sheet by welding to form a coil assembly, and placing the coil assembly in a cavity of a mold; performing transfer molding with a soft magnetic colloid in a gelatinous state so that the coil is entirely buried in the colloid while the electrode sheets at two ends of the air-core coil are at least partially exposed outside the colloid to serve as terminal electrodes; and performing demolding after the colloid is cured to form a magnet, and finishing the terminal electrodes to obtain the inductor.

2 Claims, 3 Drawing Sheets

(56) References Cited

U.S. PATENT DOCUMENTS

| | | | | |
|---|---|---|---|---|
| 2002/0158739 A1 | * | 10/2002 | Shibata | ............... H01F 41/0246 |
| | | | | 336/90 |
| 2009/0250836 A1 | * | 10/2009 | Fukui | .................... H01F 41/005 |
| | | | | 264/272.15 |
| 2010/0090790 A1 | | 4/2010 | Azuma | |
| 2017/0053741 A1 | * | 2/2017 | Stark | ..................... H01F 27/292 |
| 2017/0345540 A1 | | 11/2017 | Guo | |

FOREIGN PATENT DOCUMENTS

| | | | |
|---|---|---|---|
| CN | 102856037 A | | 1/2013 |
| CN | 202796373 | | 3/2013 |
| CN | 205542250 | | 8/2016 |
| CN | 106158245 A | | 11/2016 |
| CN | 106653307 | | 5/2017 |
| CN | 206271495 | | 6/2017 |
| CN | 107170547 | * | 9/2017 |
| CN | 107564698 | | 1/2018 |
| CN | 109411175 | * | 3/2019 |
| CN | 111128526 | * | 5/2020 |
| JP | 62-31103 | | 2/1987 |
| JP | 2006-332294 A | | 12/2006 |
| JP | 2007-227426 A | | 9/2007 |
| JP | 2015-53407 A | | 3/2015 |
| JP | 2015-88545 A | | 5/2015 |
| JP | 2015088545 | * | 5/2015 |
| TW | 536714 | * | 6/2003 |

* cited by examiner

MANUFACTURING METHOD OF A TRANSFER-MOLDED INDUCTOR

CROSS REFERENCE TO RELATED APPLICATIONS

This application is a continuation application of PCT/CN2018/105406, filed on Sep. 13, 2018. The contents of PCT/CN2018/105406 are all hereby incorporated by reference.

BACKGROUND OF THE INVENTION

1. Field of the Invention

The present application relates to a transfer-molded inductor and a manufacturing method thereof.

2. Description of the Prior Art

At present era of rapid development of science and technology, the update of electronic products is very rapid, and people's requirements on the performance and reliability of electronic products are increasingly strict, therefore, the electronic components used in electronic products must be updated accordingly. Take inductors for example, requirements on use voltage, current, frequency and the like of inductors are higher and higher, and the conventional molded inductors have many defects, so that process products cannot meet requirements of some customers; meanwhile, the manufacturing process of conventional integrally-molded inductors has hit a certain plateau and is hard to make a breakthrough.

The conventional dry-pressing integrally-molded inductors require high molding pressure, which causes great deformation of copper wires as well as proneness to open circuit, short circuit and the like in the pressing process; in addition, the requirements on molding equipment are high, while the press tonnage of presser is limited, which in turn limits the production efficiency of the products.

The disclosure of the above background is merely for assisting in understanding the inventive concepts and technical solutions of the present application, and does not necessarily belong to the prior art of the present application. Insofar as there is no explicit evidence that the above-mentioned contents have been disclosed before the filing date of the present application, the above-mentioned background should not be used for evaluating the novelty and inventiveness of the present application.

SUMMARY OF THE INVENTION

The present application mainly aims to overcome the defects in prior art and provides a transfer-molded inductor and a manufacturing method thereof, which may adopt one-step molding under a relatively small pressure, so as to solve the technical problems of high molding pressure, high requirements on forming equipment, and short circuit, open circuit or current leakage resulting from copper wire damage caused by high molding pressure in prior art.

In order to solve the above technical problems, one embodiment of the application provides the following technical solution:

a transfer-molded inductor, comprises:

a magnet formed by transfer molding with a soft magnetic colloid; and a prefabricated coil assembly comprising a prefabricated air-core coil and electrode sheets connected at two ends of the air-core coil, the coil assembly being buried by the soft magnetic colloid during transfer molding so that the air-core coil is entirely within the magnet while the electrode sheets connected at the two ends of the air-core coil are at least partially exposed outside the magnet so as to form terminal electrodes of the inductor.

Further, joints of the air-core coil and the electrode sheets are inside the magnet.

Further, a part, inside the magnet, of the electrode sheet comprises a welding portion which is welded to the air-core coil and a reinforcing portion which is not welded to the air-core coil.

According to the transfer-molded inductor provided by the above embodiment of the application, the soft magnetic colloid and the prefabricated coil assembly are integrally molded through transfer molding, and the molding pressure is low, so that deformation of copper wires in the obtained inductor is small, and the reliability of a product is not influenced; moreover, the product has high dimensional precision and good stability.

In order to solve the above technical problems, another embodiment of the application provides the following technical solution:

a manufacturing method of a transfer-molded inductor, comprises the steps of:

s1, connecting a prefabricated air-core coil and an electrode sheet by welding to form a coil assembly, and placing the coil assembly in a cavity of a prefabricated mold;

s2, performing transfer molding with a soft magnetic colloid in a gelatinous state so that the air-core coil is entirely buried in the soft magnetic colloid in the gelatinous state while the electrode sheets at two ends of the air-core coil are at least partially exposed outside the soft magnetic colloid to serve as terminal electrodes of the inductor; and s3, performing demolding after the soft magnetic colloid in the mold is cured to form a magnet, and finishing the terminal electrodes to obtain the transfer-molded inductor.

Further, the soft magnetic colloid is solid at normal temperature, and is gelatinous after being heated to a preset temperature.

Further, the soft magnetic colloid contains soft magnetic powder particles, an organic adhesive, a lubricant and a curing agent, and the preset temperature is 150~200° C.

Further, the soft magnetic powder particles include at least one of Fe—Ni system particles, Fe—Si—Al system particles, Fe—Si system particles, Fe—Si—Cr system particles and Fe system particles, and have a particle size of 5~50 μm.

Further, solid content of the soft magnetic powder particles in the soft magnetic colloid is 95 wt % or more. In the preferred solution, the soft magnetic powder is added to a high content, which increases the magnetic conductivity of the product, so that the problem of low magnetic conductivity of the gelatinous magnetic colloid at normal temperature is solved, and the characteristics of the product are greatly improved.

Further, the soft magnetic colloid in the gelatinous state has a viscosity of 10,000~20,000 cps.

Further, the transfer molding is performed under a molding pressure of 10~20 MPa.

According to the manufacturing method provided by the above embodiment of the application, through transfer molding, the gelatinous soft magnetic colloid and the prefabricated coil assembly may be integrally molded into the inductor under a relatively small molding pressure, and the small molding pressure greatly reduces internal stress of the product and also prevents damages to the coil, so that the condition that the reliability of the product is influenced due to large deformation or even damages to the coil caused by excessive molding pressure is prevented, meanwhile, due to the fact that the magnetic colloid has good fluidity and is in a gelatinous state after being heated, almost no gaps exist in the powder during molding, thereby permitting better bonding force, higher density and higher strength of the product; by adopting the molding method, mutual friction during bonding which causes damages to an insulating layer on the surface of the powder can be prevented, so that insulation, pressure resistance and rustproof capabilities of the product are greatly improved, and the electrical characteristics and reliability of the product are greatly improved; on the other hand, as molding pressure required by the manufacturing method of the present application is very low, the pressure of equipment is no longer a bottleneck of the molding process, and batch production may be realized in a matrix mode, so that the production efficiency may be greatly improved, and the production cost may be reduced.

These and other objectives of the present invention will no doubt become obvious to those of ordinary skill in the art after reading the following detailed description of the preferred embodiment that is illustrated in the various figures and drawings.

DETAILED DESCRIPTION

The present application will now be further described with reference to drawings and embodiments.

Figure 1:
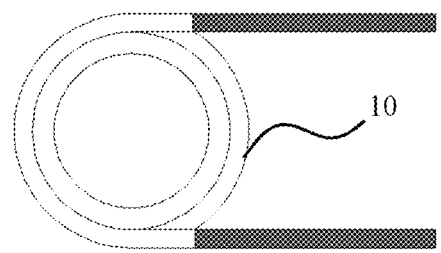
FIG. 1 is a schematic diagram of a prefabricated air-core coil in a transfer-molded inductor according to an embodiment of the present application.

An embodiment of the application provides a manufacturing method of a transfer-molded inductor, and a transfer molding process is adopted for integral molding of the inductor, the manufacturing method comprises the following steps of s1 to s3:

s1, a prefabricated air-core coil and an electrode sheet are connected by welding to form a coil assembly, and the coil assembly is placed in a cavity of a prefabricated mold. As shown in FIG. 1, an exemplary prefabricated air-core coil 10 is formed by winding a plurality of turns of enameled wire, and is hollow and has two ends. The enameled wire can be a round wire or a flat wire, and the coil formed by winding can be circular-shaped as shown in FIG. 1 and can also be oval-shaped, racetrack-shaped, or the like, which is not restricted in the present application.

Figure 3:
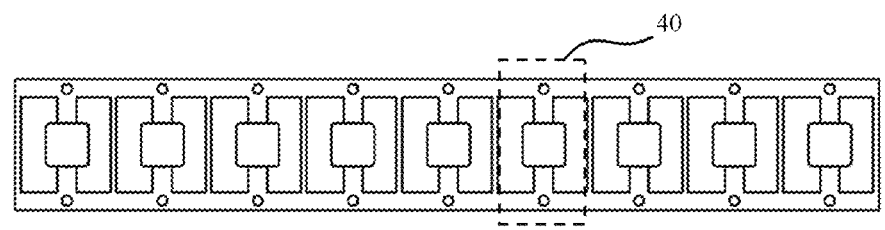
FIG. 3 is a schematic diagram of a semi-finished product obtained after demolding during transfer molding in an embodiment.
Figure 4:
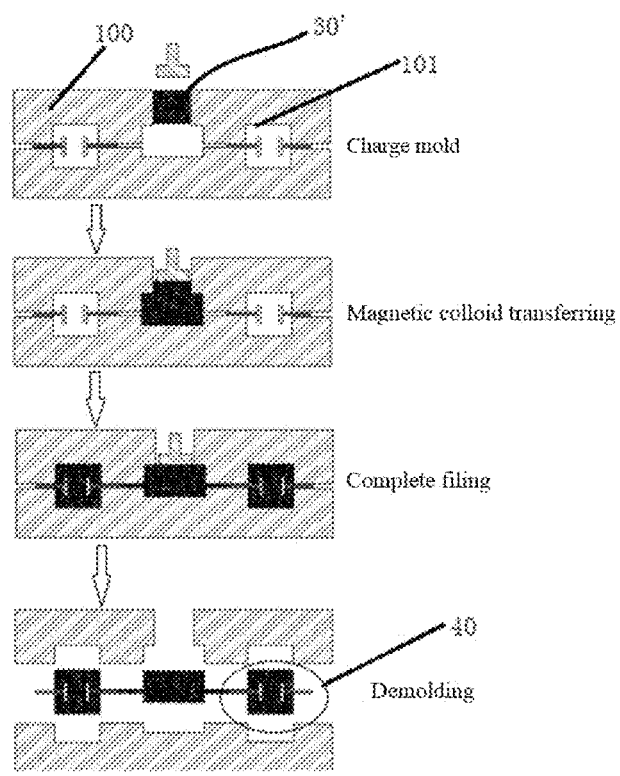
FIG. 4 is a schematic diagram of a transfer molding process according to an embodiment of the present application.
Figure 5:
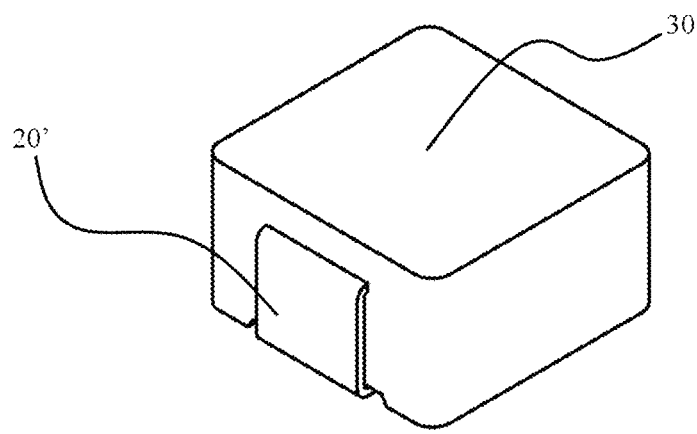
FIG. 5 is a schematic diagram of a transfer-molded inductor manufactured according to the present application.

In one embodiment, the electrode sheet used herein includes two separated same electrode sheets, and the two electrode sheets are respectively connected at the two ends of the air-core coil by welding to form the coil assembly. In another embodiment, the electrode sheet also can be an integral electrode sheet as shown in FIG. 3, and the integral electrode sheet has two symmetrical connecting portions to be connected respectively at the two ends of the air-core coil to form a coil assembly in another form.

s2, transfer molding is performed with a soft magnetic colloid in a gelatinous state so that the air-core coil is entirely buried in the soft magnetic colloid in the gelatinous state while the electrode sheets at the two ends of the air-core coil are at least partially exposed outside the soft magnetic colloid to serve as terminal electrodes of the inductor. As shown in FIG. 4, the prefabricated coil assembly is placed in a cavity 101 of a mold 100, thereafter, the mold is closed, a cake 30' (solid soft magnetic colloid) is put into the mold, the cake is heated (heated to a temperature of 150~200° C.) by the mold and becomes gelatinous, and the gelatinous soft magnetic colloid has fluidity and can start to flow to be transferred into the cavity 101 under a very small pressure so as to bury the entire air-core coil and part of the electrode sheet of the coil assembly. According to the present application, the transfer molding process only requires a molding pressure of 10~20 MPa.

s3, demolding is preformed after the soft magnetic colloid in the mold is cured to form a magnet, thereby obtaining the transfer-molded inductor. As shown in FIG. 4, the gelatinous soft magnetic colloid can be cured in a few minutes after filling is completed so as to form a magnet, and at this time, a semi-finished product 40 can be demolded and taken out. In an embodiment where an integral electrode sheet is used, an obtained exemplary semi-finished product is shown in FIG. 3, in this case, a final terminal electrode 20' can be formed by just finishing the exposed electrode sheet, such as cutting, folding or the like, and the transfer-molded inductor shown in FIG. 5 can be obtained. As shown in FIG. 5, the transfer-molded inductor comprises a magnet 30 and a coil assembly which is partially within the magnet 30, an air-core coil of the coil assembly is entirely within the magnet, while the electrode sheet has a part inside the magnet as well as the other part exposed outside the magnet to serve as terminal electrodes.

Figure 2:
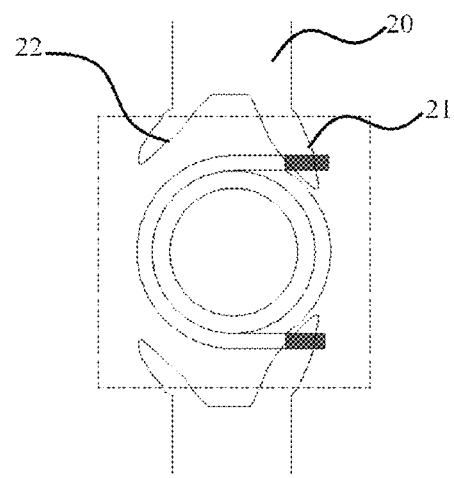
FIG. 2 is a schematic diagram of a coil assembly formed by connecting a prefabricated air-core coil and electrode sheets by welding.

The two ends of the air-core coil 10 are respectively connected with the electrode sheets by welding (e.g., laser welding) with welds inside the magnet 30. As shown in FIG. 2, in a more preferred embodiment, the part, inside the magnet, of the electrode sheet comprises a welding portion 21 which is welded to the air-core coil 10 and a reinforcing portion 22 which is not welded to the air-core coil. It is contemplated that the ends of the coil have less area and provide relatively narrow place for welding with the electrode sheets, therefore, in order to reinforce the stability of the integral connection between the electrode sheets and the magnet, the part, inside the magnet, of the electrode sheet can be designed to have a "Y" shape as shown in FIG. 2, with the welding portion 21 on one side and the reinforcing portion 22 on the other side.

The soft magnetic colloid mentioned above is solid at normal temperature, and is gelatinous after being heated to a preset temperature. In one embodiment of the application, the soft magnetic colloid contains soft magnetic powder particles, an organic adhesive, a lubricant and a curing agent, and becomes gelatinous after being heated to 150~200° C. to be used for transfer molding, and can be rapidly cured in just a few minutes.

In a more preferred embodiment, the soft magnetic powder particles include at least one of Fe—Ni system particles, Fe—Si—Al system particles, Fe—Si system particles, Fe—Si—Cr system particles and Fe system particles, and have a particle size of 5~50 μm. Moreover, in order to obtain a higher magnetic conductivity, the solid content of the soft magnetic powder particles in the soft magnetic colloid can be 95 wt % or more, and the soft magnetic colloid in the gelatinous state has a viscosity of 10,000~20,000 cps.

Specific implementation and beneficial effects of the technical solution of the present application are described below by way of a specific example.

An enameled copper wire was used and wound into an air-core coil through outer-winding, and the enamel coat of two ends of the coil was removed through mechanical peeling to obtain an air-core coil 10 as shown in FIG. 1. The air-core coil and electrode sheets were connected by laser welding to form a coil assembly as shown in FIG. 2 (wherein dashed lines are used to illustrate the scope covered by the magnet). Preferably, the electrode sheet was manufactured by making a copper sheet into a desired shape and then subjecting the copper sheet to a tin fog process. Then, the coil assembly was placed in a pre-designed mold.

After that, a pre-prepared soft magnetic colloid, which is already in a gelatinous state, was injected into the mold, according to a process of transfer molding as shown in FIG. 4. Wherein, the soft magnetic colloid contained magnetic powder of FeSiCr, and the raw powder was subjected to passivation and insulation treatment, the particle size of the magnetic powder being about D50=20 μm and the solid content of the magnetic powder being 95 wt % or more; preferably, silicone resin and epoxy resin were used as an organic adhesive in the soft magnetic colloid with a content of 5 wt % or less, the viscosity of the prepared soft magnetic adhesive at 170° C. is 15,000 cps, and the process of transfer molding as shown in FIG. 4 was performed under a molding pressure of 20 MPa, thereby obtaining a transfer-molded inductor sample. Several groups of samples were prepared through the method described above under a molding pressure within a range of 10-20 MPa.

Conventional dry pressing and molding were performed using magnetic powder in the same configuration to manufacture inductors, and the obtained products are compared with the above-mentioned samples obtained according to the present application, as shown in the following table 1:

TABLE 1

Figure 6A:
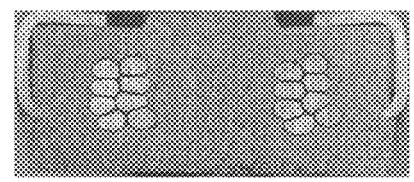
FIGS. 6a to 6c are cross-sectional views of inductors manufactured via three different processes.
Figure 6B:
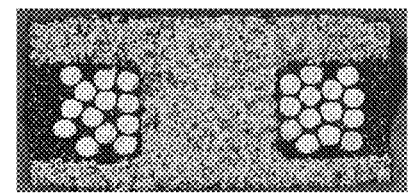
Figure 6C:
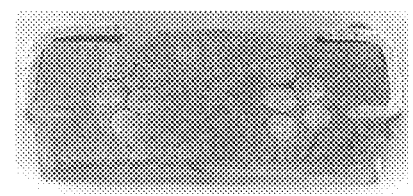

| Technical platform | Molding pressure/ MPa | Deformation of copper wires | Solid content of magnetic powder/ wt % | Magnetic conductivity |
|---|---|---|---|---|
| Conventional dry pressing | 500-800 | Obvious deformation (as shown in FIG. 6a) | 95% | 22-28 |
| Molding | 0-300 | Non-obvious deformation (as shown in FIG. 6b) | 60% | 6-10 |
| Transfer molding | 10-25 | Non-obvious deformation (as shown in FIG. 6c) | 96% | 25-32 |

Besides, as compared with conventional dry pressing products, the samples obtained according to the present application also have some electrical and mechanical properties greatly improved, as shown in the following table 2:

TABLE 2

| | Specification | | | | | | | | |
|---|---|---|---|---|---|---|---|---|---|
| | | | | | | | | Saturation current/A | |
| Product | Inductance/μH | Quality factor | Direct-current resistance/mΩ | Insulation Resistance/MΩ | Withstand voltage/V | Strength/N | Salt fog standard/h | Max | Typ |
| Conventional dry pressing products | 0.82 | 29.6 | 4.85 | 215 | 190 | 255 | 24 | 16 | 19 |
| Transfer-molded products | 0.82 | 40 | 4.85 | 1870 | 500 | 450 | 240 | 17 | 20 |

As can be seen from the above table, compared with conventional dry pressing, the method provided by the application adopts transfer molding for manufacturing inductors, and may produce inductors with higher magnetic conductivity and some greatly improved electrical and mechanical properties under the condition of using substantially same raw materials; in addition, conventional dry pressing causes obvious deformation of copper wires (as shown in FIG. 6a) and is prone to cause copper wire damages, open circuit, short circuit and the like, while the method provided by the present application only causes non-obvious deformation of copper wires which does not influence the reliability of products. As for the molding, the molding pressure for molding process is just slightly lower than that of the conventional dry pressing, which still brings high requirements on press tonnage of a presser during molding.

Therefore, according to the transfer-molded inductor and the manufacturing method thereof provided by the present application, not only is the molding pressure required greatly reduced to prevent large deformation of copper wires, but also higher magnetic conductivity may be obtained, requirements on molding equipment are not high, process conditions and product reliability may be improved, the production cost may be reduced, and batch production may be realized thereby improving the production efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A manufacturing method of a transfer-molded inductor, comprising steps of:
   s1, connecting a prefabricated air-core coil and electrode sheets by welding to form a coil assembly, and placing the coil assembly in a cavity of a prefabricated mold;
   s2, performing transfer molding with a soft magnetic colloid in a gelatinous state so that the air-core coil is entirely buried in the soft magnetic colloid in the gelatinous state while the electrode sheets at two ends of the air-core coil are at least partially exposed outside the soft magnetic colloid to serve as terminal electrodes of the inductor; wherein the soft magnetic colloid contains soft magnetic powder particles, an organic adhesive, a lubricant and a curing agent, silicone resin and epoxy resin are used as the organic adhesive and solid content of the soft magnetic powder particles in the soft magnetic colloid is 95 wt % or more, wherein the soft magnetic colloid is solid at normal temperature, and is gelatinous after being heated to a preset temperature of 150~200° C., wherein the soft magnetic colloid in the gelatinous state has a viscosity of 10,000~20,000 cps, wherein the transfer molding is performed under a molding pressure of 10~20 MPa; and
   s3, performing demolding after the soft magnetic colloid in the mold is cured to form a magnet, and finishing the terminal electrodes to obtain the transfer-molded inductor.

2. The manufacturing method of claim 1, wherein the soft magnetic powder particles include at least one of Fe—Ni system particles, Fe—Si—Al system particles, Fe—Si system particles, Fe—Si—Cr system particles and Fe system particles, and have a particle size of 5~50 μm.

* * * * *